United States Patent
Kallur Palli Kumar (10) Patent No.: US 12,293,305 B2
(45) Date of Patent: May 6, 2025

(54) CONFIDENCE SCORE BASED MACHINE LEARNING MODEL TRAINING

(71) Applicant: Intuit Inc., Mountain View, CA (US)

(72) Inventor: Sricharan Kallur Palli Kumar, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 1015 days.

(21) Appl. No.: 17/331,865

(22) Filed: May 27, 2021

(65) Prior Publication Data

US 2022/0383152 A1 Dec. 1, 2022

(51) Int. Cl.
*G06N 5/04* (2023.01)
*G06N 20/00* (2019.01)

(52) U.S. Cl.
CPC .............. *G06N 5/04* (2013.01); *G06N 20/00* (2019.01)

(58) Field of Classification Search
CPC G06N 5/04; G06N 5/01; G06N 20/00; G06N 20/10; G06N 3/044; G06N 7/01
See application file for complete search history.

(56) References Cited

U.S. PATENT DOCUMENTS 8,868,472 B1 * 10/2014 Lin .......................... G06N 5/02
706/12
11,816,550 B1 * 11/2023 Gupta ....................... G06N 5/01
2020/0387833 A1 * 12/2020 Kursun .................. G06N 20/20
2021/0256420 A1 * 8/2021 Elisha ...................... G06N 5/04
2021/0287131 A1 * 9/2021 Bhide ...................... G06N 5/04

OTHER PUBLICATIONS

Collier et al., "CactusNets: Layer Applicability as a Metric for Transfer Learning," In 2018 International Joint Conference on Neural Networks (IJCNN), pp. 1-8. IEEE, 2018.
Lee et al., "Training Confidence-Calibrated Classifiers for Detecting Out-of-Distribution Samples," arXiv preprint arXiv:1711.09325, 16-pages, 2017.
Lee et al., "A Simple Unified Framework for Detecting Out-of-Distribution Samples and Adversarial Attacks," arXiv preprint arXiv:1807.03888, 20-pages, 2018.

* cited by examiner

*Primary Examiner* — Dave Misir
(74) *Attorney, Agent, or Firm* — Paradice & Li LLP (57) ABSTRACT

Systems and methods for training a machine learning model are disclosed. A system may be configured to obtain a plurality of training samples. The system includes a machine learning model to generate predictions and generate a confidence score for each generated prediction. In this manner, the system is configured to, for each training sample of the plurality of training samples, generate a prediction by a machine learning model based on the training sample and generating a confidence score associated with the prediction by the machine learning model. The system is also configured to train the machine learning model based on the plurality of predictions and associated confidence scores. For example, one or more training samples may be excluded from use in training the machine learning model based on the associated one or more confidence scores (such as the confidence score being less than a threshold).

16 Claims, 2 Drawing Sheets

CONFIDENCE SCORE BASED MACHINE LEARNING MODEL TRAINING

TECHNICAL FIELD

This disclosure relates generally to training of a machine learning model based on generated confidence scores by the machine learning model.

DESCRIPTION OF RELATED ART

Machine learning models are used in many applications to predict outputs. For example, a machine learning model may receive a scanned document data as input and predict the type of information included in the document data. In another example, a machine learning model may receive historical asset prices (such as prices of homes, bonds, stocks, or other types of assets over time) and other measurements (such as macroeconomic or microeconomic factors that may affect the asset price) to predict a current or future asset price. A machine learning model is trained using training data in order to provide more accurate predictions. For example, historical input data and known outputs desired to be predicted by the machine learning model may be used to train the machine learning model to approximate predicting the known outputs based on the historical input data.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable attributes disclosed herein.

One innovative aspect of the subject matter described in this disclosure can be implemented as a method for training a machine learning model. The example method includes obtaining a plurality of training samples. The method also includes, for each training sample of the plurality of training samples, generating a prediction by a machine learning model based on the training sample and generating a confidence score associated with the prediction by the machine learning model. The method also includes training the machine learning model based on the plurality of predictions and associated confidence scores.

Another innovative aspect of the subject matter described in this disclosure can be implemented in a system for training a machine learning model. An example system includes one or more processors and a memory storing instructions that, when executed by the one or more processors, cause the system to perform operations. The operations include obtaining a plurality of training samples. The operations also include, for each training sample of the plurality of training samples, generating a prediction by a machine learning model based on the training sample and generating a confidence score associated with the prediction by the machine learning model. The operations also include training the machine learning model based on the plurality of predictions and associated confidence scores.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like numbers reference like elements throughout the drawings and specification.

DETAILED DESCRIPTION

Implementations of the subject matter described in this disclosure may be used to train a machine learning model. A machine learning model is used in many real world applications to generate predictions of desired information if the information is unknown. For example, machine learning models may be used by geological services to predict earthquake locations and timing, may be used by weather forecasting services to predict hurricane trajectories and speeds, may be used by a real estate agent to predict an optimum asking price of a house to be placed on the market, may be used by a tax return preparer to generate electronic data of income, taxes paid, and other data needed that is predicted from a tax document in paper form that is scanned, may be used by an insurance actuarial to predict car insurance costs, may be used by a city planner or other municipality entity to predict traffic flow and congestion, and so on.

A machine learning model may be trained over time to improve in providing more accurate predictions with little to no oversight required by the user. For example, a machine learning model's training may be unsupervised, wherein a computing system (such as a personal computer, a server, or one or more other electronic devices) automatically trains the machine learning model by adjusting one or more of its components based on its historical predictions and the actual outcomes that the machine learning model attempted to predict. For example, the machine learning model may include a feedback loop to compare the outcomes with the machine learning model's predictions and adjust the machine learning model to converge the predictions towards the known outputs). In this manner, training samples (which include the input data and the known output associated with the input data) are used by the system in training the machine learning model. Training a machine learning model may occur at initial setup of the machine learning model before the machine learning model is deployed for its intended purpose and/or while the machine learning model is deployed and operational for its intended purpose.

Various types of machine learning models exist. Machine learning models may be based, e.g., on one or more of decision trees, random forests, logistic regression, nearest neighbors, classification trees, control flow graphs, support vector machines, naïve Bayes, Bayesian Networks, value sets, hidden Markov models, or neural networks configured to generate predictions for the intended purpose. The examples herein refer to a neural network as a machine learning model for clarity in explaining aspects of the present disclosure, but the present disclosure may be applied to any suitable machine learning model to be trained.

Training the machine learning model (e.g., a neural network) is based on training samples of input data and known outputs (also referred to as desired predictions). If the machine learning model would be a perfect predictor, the machine learning model's predictions would be the same as the desired predictions. In training a neural network, relationships between nodes of the neural network or other factors may be adjusted to attempt to converge predictions from the neural network towards the known outputs that were attempted to be predicted by the machine learning model. The difference between the desired predictions and the actual predictions may be referred to as a loss. In some trainings of machine learning models, the computing system attempts to reduce or minimize the loss to improve the accuracy of future predictions by the machine learning model.

The training samples (also referred to as training data) may include noisy data or samples that are irrelevant to or harmful in training a machine learning model (referred to herein as noisy training data). For example, a machine learning model for optical recognition may be trained to categorize images as either an image of a dog or an image of a cat. If one training sample includes an input of an image of a rabbit, the machine learning model attempts to categorize the rabbit as either a dog or a cat, and any feedback associated with the image of the rabbit may not help in training the machine learning model since the training sample is undesired and irrelevant for the specific machine learning model. In other examples, crumpled documents may cause irrelevant data in a scan of the documents that would impact training of a machine learning model in a document extraction application, or noise in time series data may impact training of a machine learning model in a forecasting problem. Typical computing systems are unable to automatically identify and exclude irrelevant training samples from noisy training data to prevent such training samples from impacting the training of a machine learning model. As a result, predictions from a trained machine learning model may be less accurate than predictions from the machine learning model trained using training data excluding the irrelevant training samples. Conventional systems require personal cleaning of training data (such as manually reviewing and removing training samples by an expert) or summarily rejecting swaths of training data, which require expert knowledge and resources and/or negatively impact training of the machine learning model.

Various implementations of the subject matter disclosed herein provide one or more technical solutions to the technical problem of training machine learning models based on noisy training data. In some implementations, the machine learning model is configured to generate predictions and a confidence score associated with each prediction made by the machine learning model. The confidence score indicates a confidence in the specific prediction. A lower confidence score may indicate a lower confidence in the prediction (such as a higher probability that the prediction is inaccurate). A computing system may be configured to train the machine learning model based on the plurality of predictions and associated confidence scores. For example, the computing system may exclude one or more training samples from being used in training the machine learning model based on the confidence scores (such as based on the prediction's associated confidence score being less than a threshold). Unlike conventional systems for training a machine learning model, configuring a machine learning model to generate a confidence score for each prediction and training the machine learning model based on the plurality of predictions allows the machine learning model to be trained without constant human supervision of the training data (such as requiring an expert to review and clean training data before being used by the computing system to train the machine learning model). In this manner, a machine learning model may be configured to provide predictions more efficiently and with less application specific expertise and supervision.

Various aspects of the present disclosure provide a unique computing solution to a unique computing problem that did not exist prior to the creation of machine learning models. As such, implementations of the subject matter disclosed herein are not an abstract idea such as organizing human activity or a mental process that can be performed in the human mind. Training a machine learning model and using the machine learning model to perform its intended task cannot be performed in the human mind, much less using pen and paper.

Figure 1:
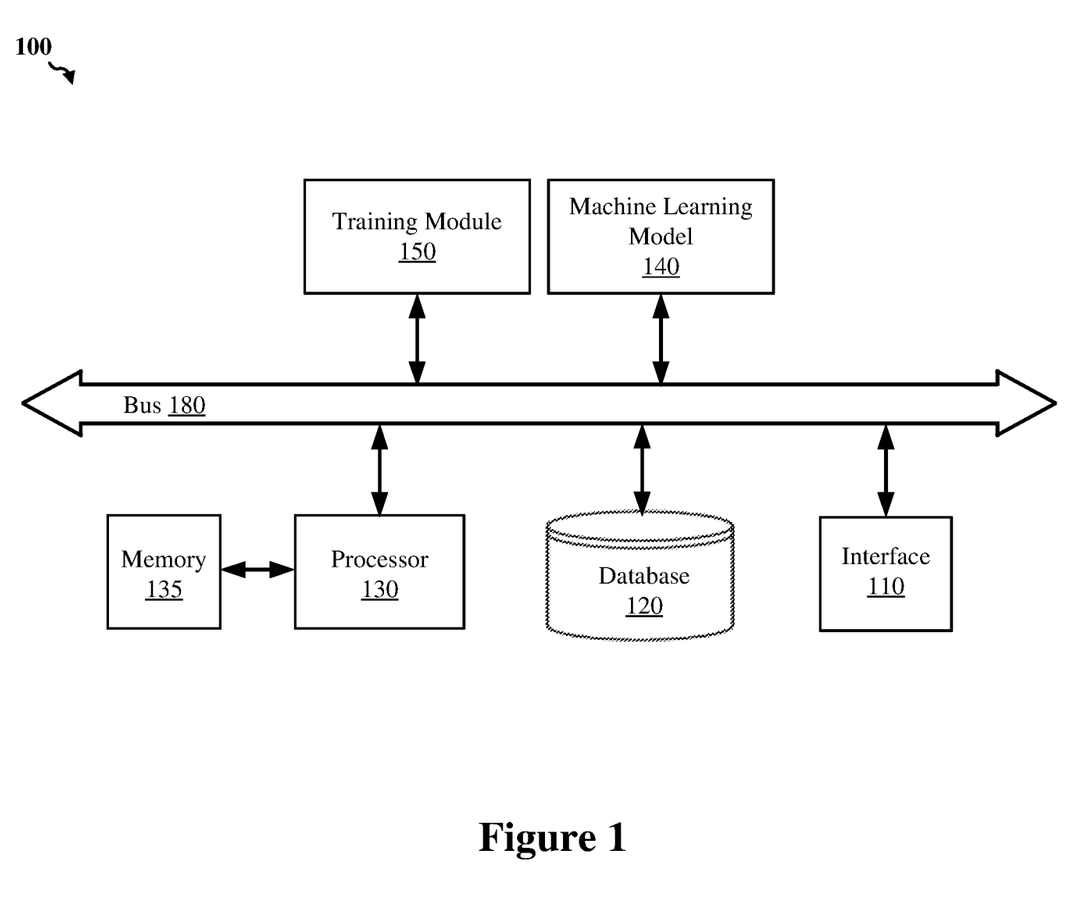
FIG. 1 shows an example system for training a machine learning model.

FIG. 1 shows an example system 100 for generating one or more credit profiles, according to some implementations. The system 100 includes an interface 110, a database 120, a processor 130, a memory 135 coupled to the processor 130, a machine learning model 140, and a training module 150. In some implementations, the various components of the system 100 may be interconnected by at least a data bus 180, as depicted in the example of FIG. 1. In other implementations, the various components of the system 100 may be interconnected using other suitable signal routing resources.

The interface 110 may be one or more input/output (I/O) interfaces to receive training or input data (such as to the machine learning model 140) and provide one or more predictions generated by the system 100 (such as by the machine learning model 140). An example interface may include a wired interface or wireless interface to the internet or other means to communicably couple with user devices or financial institutions. For example, the interface 110 may include an interface with an ethernet cable or a wireless interface to a modem, which is used to communicate with an internet service provider (ISP) directing traffic to and from devices of a user or other institutions. In another example, the interface 110 may be an interface to a scanner to obtain scans of paper documents. In a further example, the interface 110 may include an interface to a local storage device or a remote storage device to obtain the input data. The interface 110 may also include a display, a speaker, a mouse, a keyboard, or other suitable input or output elements that allow interfacing with the system 100 by a local user or moderator. For example, the system 100 may be a personal computer, and the interface 110 may include a display, a keyboard, and/or a mouse.

The system 100 may be configured to execute an application for which the machine learning model 140 is used. For example, the system 100 may execute a document extraction application if the machine learning model 140 is to generate data from documents (such as document images, including scans of paper documents). In another example, the system 100 may execute a weather mapping application if the machine learning model 140 is to predict data regarding weather movement and forecasts. Additionally or alternatively, the application may be executed by a separate system, with input data and predictions being provided from and towards the separate system via the interface 110.

The database 120 may store the input data (such as training data), one or more predictions generated using the machine learning model 140, one or more applications to be executed by the system 100, one or more configurations for the machine learning model 140 (such as one or more variables, node relationship information in a neural network, or training parameters for the machine learning model 140). In some implementations, the database 120 may include a relational database capable of presenting information as data sets in tabular form and capable of manipulating the data sets using relational operators. The database 120 may use Structured Query Language (SQL) for querying and maintaining the database 120.

The processor 130 may include one or more suitable processors capable of executing scripts or instructions of one or more software programs stored in system 100 (such as within the memory 135). For example, the processor 130 may be capable of executing one or more applications (that may use the machine learning model 140), the machine learning model 140, or the training module 150. The processor 130 may include a general purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In one or more implementations, the processors 130 may include a combination of computing devices (such as a combination of a DSP and a microprocessor, a plurality of microprocessors, one or more microprocessors in conjunction with a DSP core, or any other such configuration).

The memory 135, which may be any suitable persistent memory (such as non-volatile memory or non-transitory memory) may store any number of software programs, executable instructions, machine code, algorithms, and the like that can be executed by the processor 130 to perform one or more corresponding operations or functions. For example, the memory 135 may store the one or more applications (that may use the machine learning model 140), the machine learning model 140, or the training module 150 that may be executed by the processor 130. The memory 135 may also store the input data and/or the training samples to be used by the machine learning model 140 to generate one or more predictions. In some implementations, hardwired circuitry may be used in place of, or in combination with, software instructions to implement aspects of the disclosure. As such, implementations of the subject matter disclosed herein are not limited to any specific combination of hardware circuitry and/or software.

The machine learning model 140 may one or more machine learning models to predict one or more outputs based on input data provided to the machine learning model 140 (such as input data via the interface 110, stored in the database 120, and/or stored in the memory 135). The machine learning model 140 may be configured to provide predictions for any suitable use case. For example, for a document extraction application, the machine learning model 140 may be configured to predict data within document scans (such as specific fields, lines or other objects, etc. in a document scan). The machine learning model 140 may also or alternatively predict outputs from the information included in the document scan, with the document scan information used as input data to the machine learning model.

A machine learning model 140 may include any suitable machine learning model for generating one or more predictions. For example, the machine learning model 140 may include one or more machine learning models based, e.g., on one or more of decision trees, random forests, logistic regression, nearest neighbors, classification trees, control flow graphs, support vector machines, naïve Bayes, Bayesian Networks, value sets, hidden Markov models, or neural networks configured to generate predictions for the intended purpose. In some implementations, the machine learning model 140 includes a neural network configured to generate predictions from input data. The neural network may be of any suitable type, such as a feed-forward neural network or a recurrent neural network.

The machine learning model 140 may also be configured to generate a confidence score for each prediction generated by the machine learning model 140. As noted above, the confidence score may indicate a confidence in the prediction. The confidence score may be in any suitable range of scores from a minimum confidence score to a maximum confidence score. For clarity in explaining aspects of the disclosure, the range of confidence scores is referred to being a range [0,1], with a maximum confidence score of 1 indicating full confidence in the prediction and a minimum confidence score of 0 indicating no confidence in the prediction.

With the machine learning model 140 generating a confidence score for each prediction, the machine learning model 140 is configured to generate two outputs (the prediction and its associated confidence score) for each input sample. In some implementations, an output layer of a neural network may be configured to include two nodes, with one node to output the prediction and the other node to output the associated confidence score. In this manner, training the neural network may be for training generation of the predictions as well as generation of the associated confidence scores.

The training module 150 may be configured to train the machine learning model 140. For example, the training module 150 may obtain the training data to train the machine learning model 150 (such as via the interface 110, the database 120, and/or the memory 135) and provide the training data to the machine learning model 140. The training module 150 may also be used to configure the parameters of the machine learning model 140, such as node relationships, dependencies, feedback information (such as a learning rate, number of epochs for training, etc.). The parameters and/or any other information corresponding to the machine learning model 140 that is included in or determined by the training module 150 may be stored in the memory 135, the database 120, or another suitable memory (such as a remote storage device).

While the machine learning model 140 and the training module 150 are depicted as separate components of the system 100 in FIG. 1, the components 140 and 150 may be a single component, may include additional components, may include software including instructions stored in memory 135 or the database 120, may include application specific hardware (e.g., one or more ASICs), or a combination of the above. As such, the particular architecture of the system 100 shown in FIG. 1 is but one example of a variety of different architectures within which aspects of the present disclosure may be implemented. For example, in other implementations, components of the system 100 may be distributed across multiple devices, may be included in fewer components, and so on. While the below examples are described with reference to system 100, any suitable system may be used to perform the operations described herein.

Figure 2:
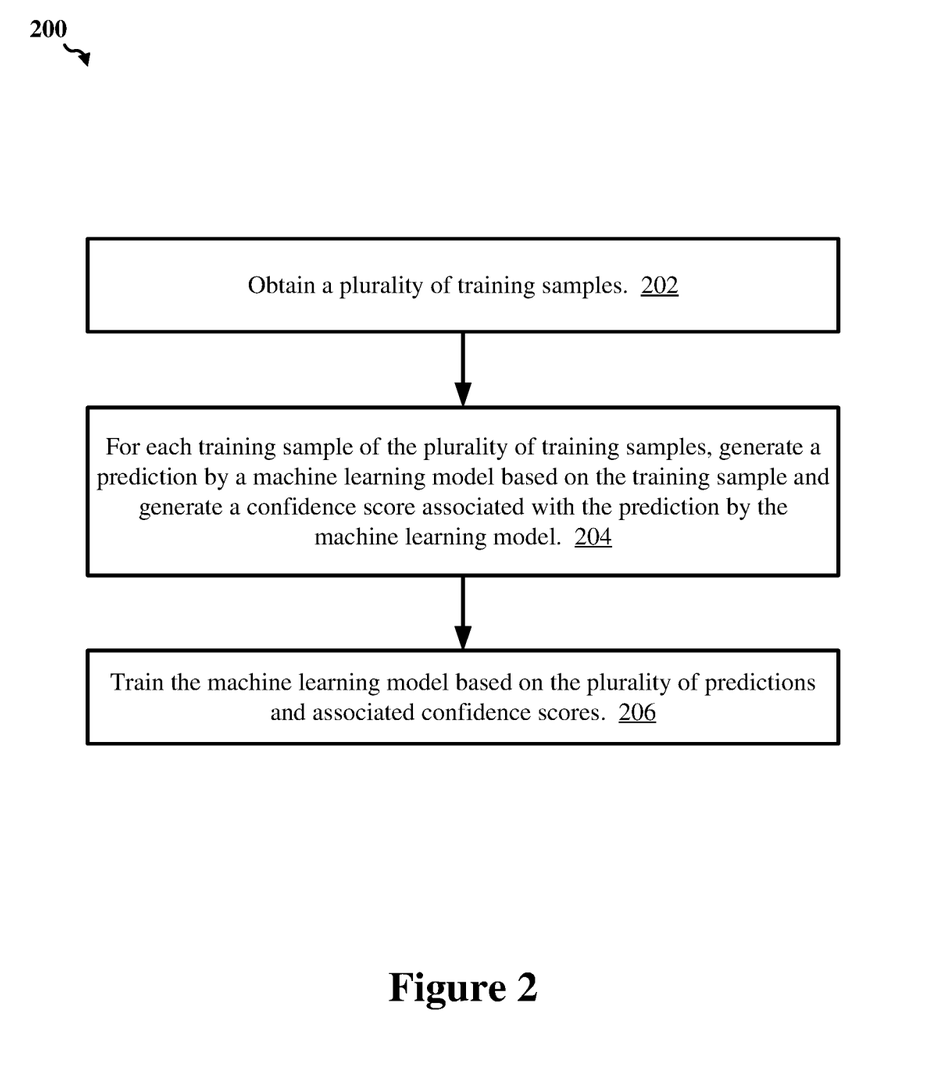
FIG. 2 shows an illustrative flow chart depicting an example operation for training a machine learning model, according to some implementations.

FIG. 2 shows an illustrative flow chart depicting an example operation 200 for training the machine learning model 140. At 202, the system 100 obtains a plurality of training samples. As noted above, the plurality of training samples may be referred to as training data. The training data includes N training samples for an integer N greater than 1. A training sample may be a training sample i for integer i from 1 to N of the training data. The training data is used for training the machine learning model 140, and the training data includes input data X and desired predictions y based on X input to the machine learning model 140 ({X, y}). For example, training sample i includes input data X, and desired prediction $y_i$ ({$X_i$, $y_i$}). In this manner, X includes {$X_1$, $X_2$, . . . $X_N$}, and y includes {$y_1$, $y_2$, . . . $y_N$}.

An input data $X_i$ of a training sample i may be any suitable data input into the machine learning model 140 to generate a prediction. For example, for a weather mapping application to predict hurricane trajectories, training sample i may be for a specific hurricane, and input data $X_i$ may include speed measurements, previous position measurements of the hurricane, wind measurements, barometric pressure, proximity to land, and other measurements that may impact the trajectory of the hurricane. In this manner, the desired prediction $y_i$ may be a known trajectory for the hurricane, with the hurricane being a previous hurricane (such as from a previous hurricane season). The system 100 is to train the machine learning model 140 to converge towards generating the desired prediction $y_i$ from the input data $X_i$. In this example, N may be associated with a number of trajectory instances (which may be for the same hurricane or different hurricanes) to be predicted or a number of hurricanes whose trajectory is to be predicted. In another example, for an application to predict asset prices, training sample i may be for a specific asset (such as housing, stocks, bonds, etc.), and input data $X_i$ may include historical prices of the asset and other measurements that may impact a future asset price. In this manner, the desired prediction $y_i$ may be a known price for the asset in the future compared to the input data $X_i$. In this example, N may be associated with a number of assets whose prices are to be predicted or a number of asset price instances (which may be for the same asset or different assets) to be predicted. In another example, for a document extraction application to predict data from information included in a document scan, training sample i may be for a specific document (such as a scan of a W-2 tax form, a 1099 tax form, etc. from the Internal Revenue Service, instruction manuals scanned or other paper documents scanned, a specific page of a scanned document, etc.), and input data $X_i$ may include data from the scan of the document (such as information regarding lines or other objects in the document, text fields extracted from the document, etc.). For a tax return preparation application, an example desired prediction $y_i$ may be a net annual income of a user based on the input data $X_i$. In this example, N may be associated with the number of documents whose data is ingested.

The training data may include historical data to initially train the machine learning model 140 and/or current data for which outcomes are later determined. For the above tax return preparation application, historical data may include the last, e.g., five years' financial documents. Current data may include the current year's financial documents. For the above weather mapping application, historical data may include the last, e.g., five hurricane seasons' input data for hurricanes. Current data may include measurements for a hurricane that is currently occurring. For historical data, the desired prediction is known. For example, a user's net income is known for the last five years. In another example, the trajectory of previously occurring hurricanes from the last five years is known. In this manner, the desired output for the historical data is known. For current data, the desired prediction becomes known over time. For example, as time passes, a user's net income becomes known or a hurricane's trajectory becomes known as the hurricane moves. In this manner, the training samples may be from historical data to initially train the machine learning model 140 and/or from current data to continue training the machine learning model 140 during operation for its intended purpose.

At 204, for each training sample of the plurality of training samples, the system 100 generates (i) a prediction by machine learning model 140 based on the training sample and (ii) a confidence score associated with the prediction by the machine learning model 140. As noted above, the machine learning model 140 is configured to output a prediction and a confidence score associated with the prediction. For example, a neural network includes two nodes at the output layer to output a prediction and a confidence score for each training sample i. Generating the prediction and the associated confidence score for a training sample i includes providing/inputting the input data $X_i$ of the training sample i to the machine learning model 140, with the machine learning model 140 generating a prediction and associated confidence score for the training sample i.

The confidence score indicates a confidence in the prediction. A confidence in the prediction is impacted in the quality of the input data X. For example, for a document extraction application, one or more documents that are scanned may be crumpled or have other creases to cause distortions in the optical scan. The creases may create phantom lines in the document or obfuscating other data in the document during scanning to cause the input data $X_i$ to be noisy for the document, and the noisy data may cause inaccuracies in the prediction (e.g., causing the prediction to diverge from the desired prediction $y_i$). In another example, the document of the training sample may not be relevant (such as a non-financial document being accidentally scanned by a user). In this manner, assuming all documents are relevant may cause training of the machine learning model 140 using all training samples to diverge the actual predictions from the desired predictions. As used herein, the actual predictions from the machine learning model 140 may be referred to as ŷ, which includes predictions $\hat{y}_i$ for integer i from 1 to N for the training data. The confidence scores may be referred to as p, which includes confidence scores $p_i$ for integer i from 1 to N for the training data. The machine learning model 140 may be noted as performing function $f_\theta(X) \rightarrow y, p$ (with $\theta$ being a parameter of the function to generate prediction y and confidence score p from input data X). In this manner, $f_\theta(X_i) \rightarrow y_i, p_i$ for i from 1 to N.

At 206, the system 100 (such as the training module 150) trains the machine learning model 140 based on the plurality of predictions and associated confidence scores. In some implementations, training the machine learning model 140 includes excluding one or more training samples of the plurality of training samples for training the machine learning model 140 based on the one or more confidence scores associated with the one or more training samples. A low confidence score $p_i$ (such as less than a confidence threshold) can indicate that the input data for the training sample i is noisy or that a training sample i is otherwise irrelevant or unwanted for training the machine learning model 140. To exclude a training sample i, the system 100 may compare the confidence score $p_i$ to a confidence threshold. If the confidence score $p_i$ is less than the confidence threshold, the system 100 excludes the training sample i from being used in training the machine learning model. In this manner, the system 100 may train the machine learning model 140 using one or more training samples of the plurality of training samples that are not excluded from being used for training.

Conventional training of a machine learning model is based on converging the predictions of the machine learning model to the desired predictions for the training data. For example, predictions are generated by the machine learning model based on the input data, the predictions are compared to the desired predictions, the predictions and desired predictions are compared, and the machine learning model is adjusted based on the comparison. The steps of generating predictions, comparing predictions to desired predictions, and adjusting the machine learning model may be recursively performed until the machine learning model is trained (such as for a number of epochs, until the divergence is less than a threshold amount, etc.). The divergence between the predictions and the desired predictions is referred to as a loss. A loss function to indicate the divergence between the predictions and the desired predictions may be used to train the machine learning model (with the output of the loss function to converge towards 0).

An example loss function for training a conventional machine learning model is provided in equation (1) below:

$$L(X, y) = \sum_{i=1}^{N} l(f_\theta(X_i), y_i) \quad (1)$$

The input to the loss function is the training data, which includes X and y. $f_\theta(X_i)$ is the output of a conventional machine learning model, which is the prediction generated by the machine learning model based on the input data $X_i$. Individual loss function $l(f_\theta(X_i), y_i)$ indicates a divergence between the prediction $f_\theta(X_i)$ and the desired prediction $y_i$. In a simple example, if the prediction and the desired prediction are single values, the output of the individual loss function may be a magnitude of the difference between the prediction and the desired prediction (e.g., $|f_\theta(X_i)-y_i|$). If the prediction and the desired prediction are multi-variables, the output of the individual loss function may be a distance function between the prediction and the desired prediction (e.g., a mean-squared error (MSE) between the values). The overall loss function is a combination of the individual loss function across the plurality of predictions. For example, as shown in equation (1) above, the loss function L outputs a sum of the individual loss function $l(f_\theta(X_i), y_i)$ outputs for integer i from 1 to N. While a summation is shown, any suitable combination of the individual loss function outputs may be used for the overall loss function.

The machine learning model 140 differs from conventional machine learning models, as the machine learning model 140 is configured to generate a confidence associated with each prediction generated by the machine learning model 140. As a result, the loss function used the train the machine learning model 140 is adjusted to account for the confidences. An example loss function for training the machine learning model 140 is provided in equation (2) below:

$$L(X, y, p) = \sum_{i=1}^{N} p_i l(\hat{y}_i, y_i) + \lambda R(p) \quad (2)$$

The input to the loss function in equation (2) is the input data and the confidences generated by the machine learning model 140. Individual loss function $l(\hat{y}_i, y_i)$ (also referred to as an individual loss) indicates a divergence between the generated prediction $\hat{y}_i$ from the machine learning model 140 and the desired prediction $y_i$ for training sample i. As noted above, the machine learning model 140 generates $\hat{y}_i$ from input data $X_i$ provided to the machine learning model 140 for training sample i of the plurality of training samples. The machine learning model 140 also generates confidence score $p_i$ associated with prediction $\hat{y}_i$ from input data $X_i$ provided to the machine learning model 140 for training sample i of the plurality of training samples. As shown in equation (2) and differing from equation (1), each individual loss function output is combined with the associated confidence score ($p_i * l(\hat{y}_i, y_i)$) to act as a weighting factor on the individual loss function, and the weighted loss function outputs are then combined (e.g., summed) for the plurality predictions and associated confidence scores from the machine learning model 140. In this manner, adjusting the machine learning model 140 to cause adjustment to the confidence scores impacts future adjustments to the machine learning model 140 to cause adjustment to the predictions. In a specific example, if the machine learning model 140 is adjusted to reduce confidence score $p_m$ for training sample m in the plurality of training samples, the output of the individual loss function $l(\hat{y}_m, y_m)$ has less effect on the overall output of the loss function L(X, y, p). In this manner, more divergence may occur between $\hat{y}_m$ and $y_m$ than for other training samples without impacting the overall loss output from the loss function L(X, y, p) as much as for similar divergences for other training samples. As the confidence score $p_m$ reduces to 0, the system 100 effectively excludes the training sample m from being used in the training the machine learning model 140, as the divergence between $\hat{y}_m$ and $y_m$ has little to no impact in the overall loss output by the loss function L(X, y, p).

The loss function L(X, y, p) also includes a regularization term R to prevent the machine learning model 140 from being trained to output all $p_i$ equal to 0 for p. If the loss function does not include the regularization term R, the system 100 may train the machine learning model 140 to generate all $p_i$ of p (for integer i from 1 to N) to equal 0. With all $p_i$ equal to 0, the loss output by the loss function L(X, y, p) would equal 0 no matter the output of the individual loss function $l(\hat{y}_i, y_i)$ for each prediction $y_i$ (in other words, $\sum_{i=1}^{N} 0 * l(\hat{y}_i, y_i) = 0$). The regularization term R provides a non-zero value to be added to each combination of the individual loss function output and the associated prediction. In this manner, the output of the loss function L(X, y, p) cannot equal zero if all $p_i$ equal 0, and the system 100 prevents training the machine learning model 140 to generate all 0 confidence scores. The regularization term R may be any suitable function to generate a value from the plurality of confidence scores.

In particular, the regularization term R is a suitable function to cause the system 100 to train the machine learning model 140 to generate a majority of the plurality of confidence scores close to 1 (such as within a tolerance of 1). For example, the regularization term R may be a function whose output increases by a minimum amount when the majority of the confidence scores is less than 1 by more than the tolerance. While 50 percent (a majority) of the confidence scores not being close to 1 is depicted as the cutoff for increasing the output of the regularization term, any suitable percentage may be used (such as 40 percent, 60 percent, 75 percent, etc.). If the percentage is 50 percent, the training module 150 using the loss function L(X, y, p) to train the machine learning model 140 ensures that at least 50 percent of the plurality of training samples (and the corresponding predictions generated by the machine learning model 140) are not excluded and thus used to train the machine learning model 140.

The variable $\lambda$ applied to the regularization term R is a tunable parameter to adjust the impact of the regularization term on the summation in the loss function based on the plurality of the confidence scores p. The tunable parameter may be a value greater than 0 that is preconfigured to a defined value, may be adjusted by the user, and/or may be adjusted by the system 100. In some implementations, the system 100 trains multiple instances of the machine learning model 140 using different $\lambda$ values, and the system 100 may use the machine learning model 140 trained to yield the smallest output from the loss function L(X, y, p).

To note, the loss function $L(X, y, p)$ in equation (2) corresponds to the loss function $L(X, y)$ in equation (1) if all $p_i$ of p equal 1 (in other words, $L(X, y, p=[1])=\Sigma_{i=1}^{N} 1*l(\hat{y}_i, y_i)+\lambda R(p)=L(X, y)$). The regularization term R may also approach 0 as more confidence scores $p_i$ are close to 1 (such as within a tolerance). In this manner, if $p_i$ equals 1 for all $p_i$ of p, the loss output by the loss function $L(X, y, p)$ is a standard loss that may be seen from a loss function $L(X, y)$ used to train conventional machine learning models.

In some implementations, the regularization term R is configured to cause the machine learning model to generate 0 or 1 values for the confidence scores (instead of values between 0 and 1). For example, the regularization term R may increase by a minimum amount for one or more confidence scores between 0 and 1 to penalize the generation of non-zero and non-one confidence scores by the machine learning model 140. In this manner, the system 100 may be configured to divide the training samples into relevant training samples (with confidence scores equaling 1) and irrelevant and excluded training samples (with confidence scores equaling 0).

Based on the loss function $L(X, y, p)$, the system 100 (such as the training module 150) training the machine learning model 140 is configured to adjust the machine learning model to increase one or more confidences scores towards the maximum confidence score (e.g., 1) when the one or more training samples associated with the one or more increased confidence scores are to be used to train the machine learning model. In other words, the machine learning model 140 is trained to increase the confidence score for training samples not excluded and thus to be used in the training of the machine learning model 140. Training of the machine learning model 140 may also include adjusting the machine learning model to decrease a confidence score towards a minimum confidence score (e.g., 0) when a training sample associated with the decreased confidence score is not to be used to train the machine learning model. In other words, the machine learning model 140 is trained to decrease the confidence score for training samples to be excluded and thus not to be used in the training of the machine learning model 140. As noted above, excluding a training sample q may be based on $p_q$ being less than a threshold confidence score, wherein q is an integer and $1 \leq q \leq N$.

While the loss function $L(X, y, p)$ in equation (2) is provided as an example loss function for training the machine learning model 140, any suitable loss function combining the predictions and the confidence scores generated by the machine learning model 140 may be used, with the loss function to be used in training the machine learning model 140 conforming to the below constraints:
(i) if all of the plurality of confidence scores equal 1, the loss function generates a standard loss associated with a standard loss function (such as the output of $L(X, y, p)$ in equation (2) compared to the output of $L(X, y)$ in equation (1) if all $p_i$ equal 1); and
(ii) if all of the plurality of confidence scores equal 0, the output of the loss function without a regularization term R would equal 0.

In this manner, the loss function conforming to the above constraints is used by the system 100 (such as the training module 150) to train the machine learning model 140 to generate the predictions ŷ and the associated confidence scores p.

While the flowchart in FIG. 2 depicts one step of obtaining training data (block 202), one step of generating a plurality of predictions and a plurality of associated confidence scores (block 204), and one step of training the machine learning model 140 (block 206), training may be a recursive process of generating the predictions and confidence scores, determining a divergence between the predictions and the desired predictions, and adjusting the machine learning model 140 to converge the predictions toward the desired predictions (such as based on reducing a loss of a loss function). As such, the method 200 depicting training of the machine learning model 140 may include fewer steps, additional steps, and/or a repetition of one or more steps. For example, generating the predictions and the confidence scores may be part of training the machine learning model 140.

With the system 100 excluding one or more training samples, irrelevant or unwanted data may be excluded from use in training the machine learning model 140. For example, for a document extraction application, a training sample generated from a crumpled document that is scanned (with the input data being noisy as a result of the document being crumpled) may be excluded from use in training the machine learning model 140. In this manner, the noisy data from the crumpled document does not negatively impact the training of the machine learning model 140. In another example, for an asset pricing application to predict the value of a house, training samples may be for different houses and their historical values. If a house is in a special neighborhood, is a distress sale, or otherwise is a poor indicator of another house's value, the training sample for the house may be excluded from use in training the machine learning model 140 (with the house's special conditions not negatively impacting the training of the machine learning model 140). While some example use cases of machine learning models are provided for excluding training samples and otherwise training the machine learning model 140, any suitable use case and any suitable machine learning model may be used in performing aspects described herein.

As used herein, a phrase referring to "at least one of" or "one or more of" a list of items refers to any combination of those items, including single members. As an example, "at least one of: a, b, or c" is intended to cover: a, b, c, a-b, a-c, b-c, and a-b-c, and "one or more of: a, b, or c" is intended to cover: a, b, c, a-b, a-c, b-c, and a-b-c.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. For example, while the figures and description depict an order of operations to be performed in performing aspects of the present disclosure, one or more operations may be performed in any order or concurrently to perform the described aspects of the disclosure. In addition, or to the alternative, a depicted operation may be split into multiple operations, or multiple operations that are depicted may be combined into a single operation. Thus, the claims are not intended to be limited to the implementations shown herein but are to be accorded the widest scope consistent with this disclosure, the principles and the novel features disclosed herein.

What is claimed is:

1. A computer-implemented method for training a machine learning model for making predictions, comprising:
   obtaining a plurality of training samples;
   generating, by the machine learning model, a plurality of predictions and a plurality of confidence scores by, for each training sample of the plurality of training samples:
      generating a prediction by the machine learning model based on the training sample; and
      generating, by the machine learning model, a confidence score associated with the prediction by the machine learning model;
   excluding one or more training samples of the plurality of training samples for subsequent training of the machine learning model based on one or more confidence scores associated with the one or more training samples; and
   training the machine learning model based on the plurality of predictions and associated confidence scores, wherein the machine learning model is further trained using one or more non-excluded training samples of the plurality of training samples, and based on a loss function L(X, y, p), wherein:
      the plurality of training samples is {X, y}, X comprising a plurality of input data including input data $X_i$ for integer i from 1 to N, wherein an integer N is a number of training samples in the plurality of training samples;
      y comprises a plurality of desired predictions based on X, wherein y includes $y_i$ for integer i from 1 to N; and
      p comprises the plurality of confidence scores associated with {X, y}, wherein $p_i$ is a confidence score associated with $y_i$ for integer i from 1 to N.

2. The method of claim 1, wherein:
   the plurality of training samples includes training sample i for integer i from 1 to N, wherein:
   training sample i is {$X_i$, $y_i$};
      $X_i$ is an input data of training sample i; and
      $y_i$ is a desired prediction of training sample i based on $X_i$.

3. The method of claim 2, wherein excluding one or more training samples includes excluding training sample q if $p_q$ is less than a threshold confidence score, wherein q is an integer and $1 \leq q \leq N$.

4. The method of claim 3, wherein if each $p_i$ for integer i from 1 to N equals a maximum confidence score, the output of the loss function L(X, y, p) is a standard training loss.

5. The method of claim 4, wherein the loss function L(X, y, p) includes a regularization term R to prevent the loss function L(X, y, p) from equaling zero when each $p_i$ for integer i from 1 to N equals a minimum confidence score.

6. The method of claim 5, wherein training the machine learning model is based on the loss function L(X, y, p)=$\sum_{i=1}^{N} p_i l(\hat{y}_i, y_i)+\lambda R(p)$ associated with the machine learning model, wherein:
   $\hat{y}_i$ is an actual prediction by the machine learning model based on $X_i$;
   $l(\hat{y}_i, y_i)$ is an individual loss determined between $\hat{y}_i$ and $y_i$; and
   $\lambda$ is a tunable parameter to adjust the regularization term R based on the plurality of confidence scores p.

7. The method of claim 6, wherein training the machine learning model also includes adjusting the machine learning model to increase one or more confidences scores towards the maximum confidence score when the one or more training samples associated with the one or more increased confidence scores are to be used to train the machine learning model.

8. The method of claim 7, wherein training the machine learning model also includes adjusting the machine learning model to decrease a confidence score towards a minimum confidence score when the training sample associated with the decreased confidence score is not to be used to train the machine learning model.

9. A system for training a machine learning model for making predictions, comprising:

one or more processors; and a memory storing instructions that, when executed by the one or more processors, causes the system to perform operations comprising:

obtaining a plurality of training samples;

generating, by the machine learning model, a plurality of predictions and a plurality of confidence scores by, for each training sample of the plurality of training samples:

generating a prediction by the machine learning model based on the training sample; and generating, by the machine learning model, a confidence score associated with the prediction by the machine learning model;

excluding one or more training samples of the plurality of training samples for subsequent training of the machine learning model based on one or more confidence scores associated with the one or more training samples; and training the machine learning model based on the plurality of predictions and associated confidence scores, wherein the machine learning model is further trained using one or more non-excluded training samples of the plurality of training samples, and based on a loss function L(X, y, p), wherein:

the plurality of training samples is $\{X, y\}$, X comprising a plurality of input data including input data $X_i$ for integer i from 1 to N, wherein an integer N is a number of training samples in the plurality of training samples;

y comprises a plurality of desired predictions based on X, wherein y includes $y_i$ for integer i from 1 to N; and p comprises the plurality of confidence scores associated with $\{X, y\}$, wherein $p_i$ is a confidence score associated with $y_i$ for integer i from 1 to N.

10. The system of claim 9, wherein:

the plurality of training samples includes training sample i for integer i from 1 to N, wherein:

training sample i is $\{X_i, y_i\}$;

$X_i$ is an input data of training sample i; and $y_i$ is a desired prediction of training sample i based on $X_i$.

11. The system of claim 10, wherein the execution of instructions to exclude one or more training samples causes the system to perform operations further including excluding training sample q if $p_q$ is less than a threshold confidence score, wherein q is an integer and $1 \leq q \leq N$.

12. The system of claim 11, wherein if each $p_i$ for integer i from 1 to N equals a maximum confidence score, the output of the loss function L(X, y, p) is a standard training loss.

13. The system of claim 12, wherein the loss function L(X, y, p) includes a regularization term R to prevent the loss function L(X, y, p) from equaling zero when each $p_i$ for integer i from 1 to N equals a minimum confidence score.

14. The system of claim 13, wherein training the machine learning model is based on the loss function $L(X, y, p) = \Sigma_{i=1}^{N} p_i l(\hat{y}_i, y_i) + \lambda R(p)$ associated with the machine learning model, wherein:

$\hat{y}_i$ is an actual prediction by the machine learning model based on $X_i$;

$l(\hat{y}_i, y_i)$ is an individual loss determined between $\hat{y}_i$ and $y_i$; and $\lambda$ is a tunable parameter to adjust the regularization term R based on the plurality of confidence scores p.

15. The system of claim 14, wherein the execution of instructions to train the machine learning model causes the system to perform operations further including adjusting the machine learning model to increase one or more confidences scores towards the maximum confidence score when the one or more training samples associated with the one or more increased confidence scores are to be used to train the machine learning model.

16. The system of claim 15, wherein the execution of the instructions to train the machine learning model causes the system to perform operations further including adjusting the machine learning model to decrease a confidence score towards a minimum confidence score when the training sample associated with the decreased confidence score is not to be used to train the machine learning model.

* * * * *